Sept. 10, 1963   W. D. BENNETT ETAL   3,103,037
EXTRUDERS
Filed Feb. 6, 1962

INVENTORS
William Douglas Bennett
Harold Hurdley Green
by Benj. T. Rauber
attorney

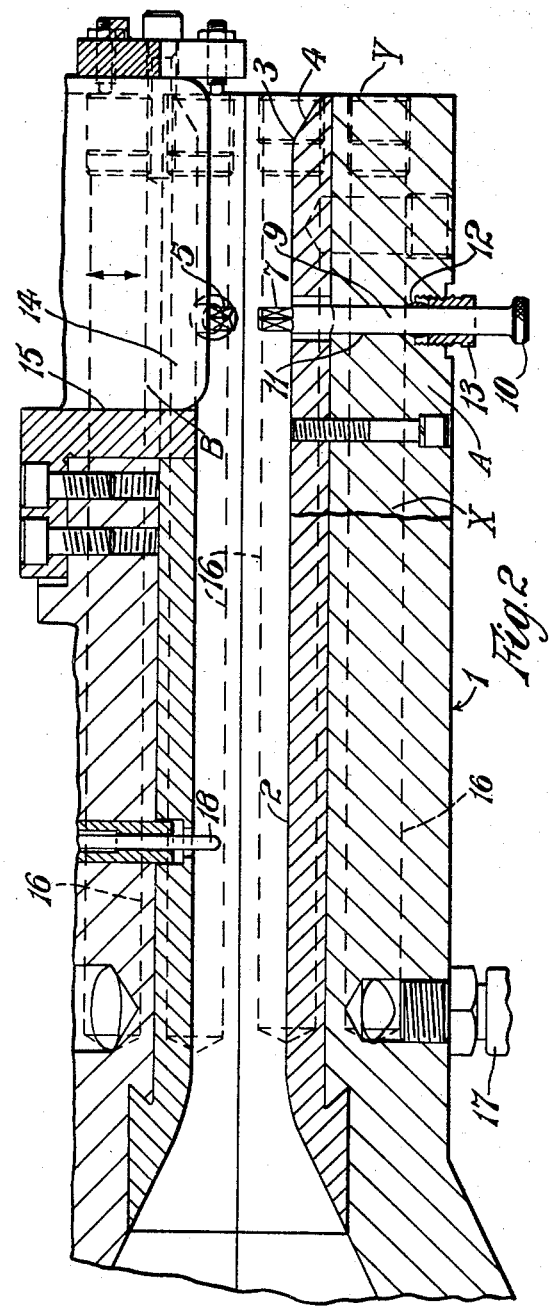

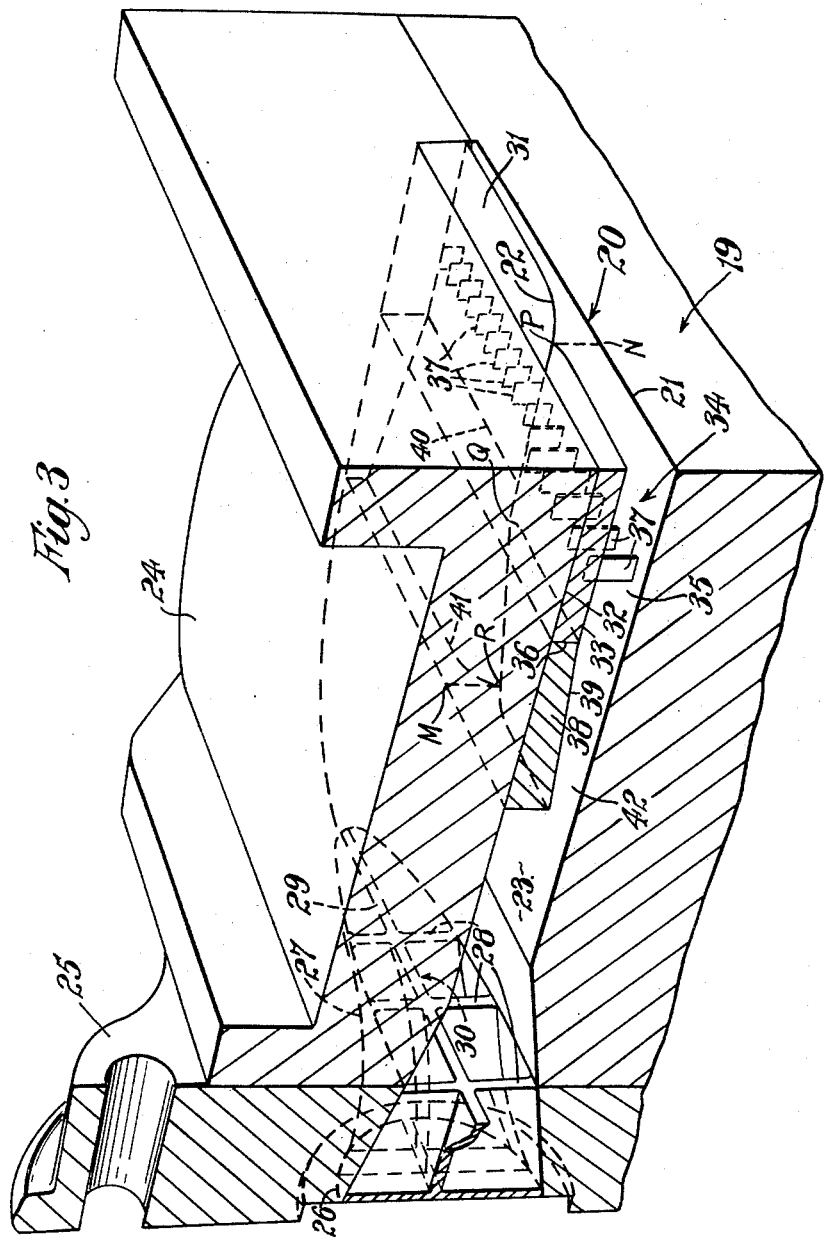

United States Patent Office 3,103,037
Patented Sept. 10, 1963

3,103,037
EXTRUDERS
William Douglas Bennett, Weston-super-Mare, and Harold Hurdley Green, Castle Bromwich, England, assignors to Dunlop Rubber Company Limited, London, England, a British company
Filed Feb. 6, 1962, Ser. No. 171,481
Claims priority, application Great Britain Feb. 8, 1961
7 Claims. (Cl. 18—12)

This invention relates to extruders, and more particularly to extrusion dies for rubber or other plastic materials.

When certain kinds of rubber, particularly synthetic rubbers, are extruded through a conventional extruder die, that is, a die in which the die orifice is formed in a metal plate fixed to an extruder barrel, stresses are set up in the rubber as it passes from the entry to the orifice of the die. These stresses cause the rubber, as it emerges from the die orifice, to vary from the desired shape, and make the emerging strip difficult to handle since the stresses cause the strip to tend to twist into a spiral or other irregular form as it travels away from the extruder die.

According to the invention, an extrusion die for plastic material such as rubber comprises an orifice and a passageway for said material to connect said orifice with means for supplying said material under pressure, the passageway having a transverse cross-sectional profile similar to that of the orifice and being provided with at least one cutting element disposed so as to cut an extrusion axially, said element being positioned so that the cut portions of the extrusion recombine before being extruded from said orifice.

Preferably, in the case of a die having a circular orifice, the ratio of the length of the passageway to the diameter of the orifice is at least 3:1.

In the case of a die having an orifice of varying height, considered at different points across the width of the orifice, such as a tread strip extrusion die, the die is preferably provided with a passageway wherein the ratio of the length of the passageway to the maximum height of the orifice is at least 3:1.

In order to achieve a substantially even flow of material through an orifice of varying height considered at different points across the width of the orifice, compensating means is preferably provided for impeding the flow of said material towards the parts of the orifice having a relatively greater height than the heights of the remaining parts of the orifice.

The compensating means may comprise a compensating passage forming a continuation of said passageway at the end of the passageway remote from the orifice, said compensating passage having, at the end thereof remote from the orifice, a transverse cross-sectional profile which varies in height across its width so that the height of the compensating passage, considered at a point on a given axial line of the die at said end remote from the orifice is relatively large where the height of the orifice measured at a point on said given axial line is small, and the height of the compensating passage considered at a point on a second axial line of the die at said end remote from the orifice is relatively small where the height of the orifice measured at a point on said second axial line is large, the compensating passage having a transverse cross-sectional profile at its end nearer to the orifice similar in form to that of the orifice, and the compensating passage having a shape which provides a gradual variation in profile between its ends.

In the case of the circular orifice the cutting elements are preferably in the form of radially disposed knife blades positioned near to the orifice, and in the case of the tread strip extrusion die the cutting elements are preferably in the form of knife blades extending in the direction in which the height of the orifice is measured. Alternatively, the, or each, cutting element may take the form of a tensioned wire.

The invention defined above is of particular value when used in conjunction with a plunger for varying the size of the die orifice to ensure that the weight per unit length of the extruded rubber strip remains constant, such a plunger being described in the specification of our co-pending application Ser. No. 171,437, filed Feb. 6, 1962, now abandoned.

Two embodiments of the invention will now be described, by way of example, with reference to the accompanying drawings, in which:

FIGURE 2 is of a sectional side elevation of the die shown in FIGURE 1 taken on the line II—II of FIGURE 1, except for the portion A, extending from the wavy line X to the end Y, which is taken on the line A—A of FIGURE 1, and the portion B which is shown in full;

FIGURE 3 is a diagrammatic perspective view of part of a pneumatic tire tread strip extrusion die.

Figure 1:
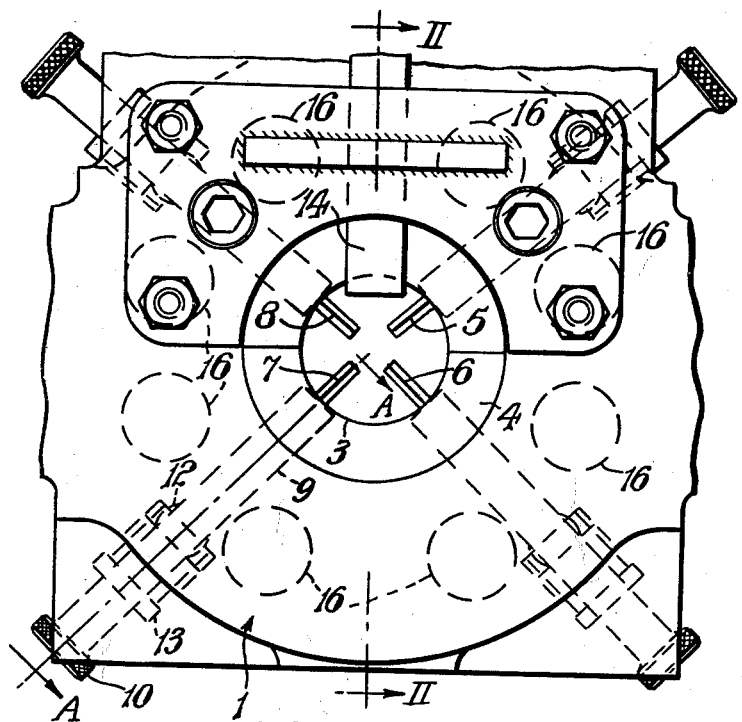
FIGURE 1 is a front elevation of part of an extrusion die.

In one form of the invention, shown in FIGURES 1 and 2, an extruder of conventional form (not shown) is provided with a horizontally disposed extruder barrel at the outlet end of which is provided a die 1 comprising a long cylindrical passageway 2 leading to a circular die orifice 3 and having a bevelled surface 4 extending a short distance beyond the orifice. The length of the cylindrical passageway 2 is approximately 10 times the diameter thereof, in the present instance the length being 13 inches and the diameter 1.3 inches. Four knife blades 5, 6, 7 and 8 are mounted in the cylindrical passageway 2, three inches from the orifice, each blade having a diamond-shaped cross-section the longer diagonal of which is parallel to the axis of the passageway. When viewed from the orifice, as in FIGURE 1, the knife blades are disposed along two mutually perpendicular diameters of the passageway, each blade extending from the wall of the passageway almost to the axis thereof. The knife blades are arranged so that each blade makes an angle of 45° with the vertical.

The knife blades 5–8 are each mounted in the die 1 in a similar manner, and the mounting of the knife blade 7 only will be described (see FIGURE 2).

The knife blade 7 is formed on the end of a shaft 9 having a knurled head 10 and slidable within a hole 11 in the die. The shaft 9 may be locked in position by a compressible ring 12 under pressure exerted by tightening a screw-threaded bush 13 on to the ring 12.

At the top of the passageway adjacent to the orifice, a plunger 14 of substantially rectangular cross-section, viewed from above, is mounted in a slide 15 so as to be movable in a vertical direction radially towards or away from the axis of the passageway. The position of the plunger is controlled by a nut (not shown) engaging a vertical screw (not shown) attached to the plunger, said nut being reversibly drivable by an electric motor and reduction gear (also not shown). The plunger and its associated driving mechanism is described in greater detail in the specification of copending application Ser. No. 171,437, and now abandoned.

The die 1 is provided with axially extending interconnected fluid circulation passages 16 to enable heating or cooling fluid to be circulated from an inlet 17 to an outlet (not shown). A thermocouple 18 is provided to enable the temperature of material passing through the die to be measured.

In operation, rubber is fed from the extruder barrel under pressure through the long cylindrical passageway 2. As the rubber travels through the passageway stresses develop in the rubber, particularly in the form of hoop stresses coaxial with the passageway, and becomes stabilized as they approach the orifice 3. When the rubber passes around the knife blades 5-8 the stressed rubber is cut, thus relieving the stresses, and the rubber then recombines into cylindrical form. Since the pressure of the rubber in the region adjacent to the orifice is low relative to the pressure in the region adjacent to the extruder barrel, very little subsequent stress is set up when the rubber has passed the knife blades and re-combined into cylindrical form.

The stable form of the extrusion produced by the above apparatus makes it possible for a weighing conveyor to be used to measure the weight per unit length of the rubber emerging from the extruder. Apparatus associated with the weighing conveyor may be provided to actuate the electric motor for controlling the position of the plunger mentioned above and thus to control the size of the die orifice 3 to hold the weight per unit length of the rubber extrusion at a constant value. Such a system is described in the specification of our co-pending application Ser. No. 95,638, filed March 14, 1961.

In an alternative embodiment of the invention, shown in FIGURE 3, an extruder (not shown) for producing unvulcanized rubber tread strip for pneumatic tires is provided with a tread strip die 19. For clarity, half of the die 19 only is shown in FIGURE 3, the remaining half being symmetrical with the half shown. The die comprises an orifice 20, having a flat lower edge 21 and an upper edge 22 formed to a suitable profile for producing tread strip.

The die 19 has a channel 23 of uniform rectangular cross-section formed in a casing 24 which is provided with a flange 25 to enable the die to be bolted to the output end of an extruder barrel (not shown). A circular opening 26 in the casing 24 is provided to enable rubber to be forced from the extruder barrel into the channel 23.

The opening 26 is connected to the rectangular channel 23 by an intermediate channel 27 containing a plurality of laminar elements in the form of vertical plates 28 and a horizontal plate 29 arranged and welded together to form a honeycomb structure 30 through which rubber from the extruder will flow in operation of the die.

A profiled plate 31 is fixed to the roof 32 of the channel 23, the lower surface 33 of the plate 31 being shaped so that its transverse cross-sectional profile at any point is similar to that of the orifice 20. A passageway 34 is thus formed between the surface 33 and the flat floor 35 of the channel 23, the passageway 34 extending from the orifice 20 to the end 36 of the plate 31.

Vertical knife blades 37 are provided in the passageway 34, as in the previous embodiment, to cut the rubber extrusion axially as it passes through the die. The blades 37 are rigidly fixed at their upper and lower ends respectively to the plate 31 and the floor 35, and are equally spaced-apart across the whole width of the die.

A second profiled plate 38 is fixed to the roof 32 of the channel 23, the lower surface 39 of the plate 38 being shaped so that the transverse edge 40 of the lower surface of the plate 38 has the same profile as the transverse cross-sectional profile of the lower surface of the plate 31. The transverse edge 41 of the lower surface of the plate 38 has a profile which is a substantially inverted form of the profile of the upper edge 22 of the die orifice, and the transverse cross-sectional profiles of said lower surface considered along transverse lines at intermediate positions between the edges 40 and 41 are such as to provide a gradual variation from the profile of the edge 40 to its substantially inverted form at the edge 41. The variation is such that the axial cross-sectional profile of the lower surface of the plate 38, considered along any axial line, consists of a straight line joining a point on the edge 41 to a point on the edge 40. For example an axial line PQR of the die runs from the point P, at which the height PN of the die orifice is large, to the point Q, which is at a height above the floor 35 of the passageway 34 equal to PN, and then in a straight line QR to the point R which is at the same distance RM, equal to PN, below the roof 32 of the channel 23 as the distance of the point P above the floor 35 of the channel 23.

A passage 42 is thus formed between the lower surface 39 of the plate 38 and the floor 35 of the channel 23 which constitutes a compensating means in the form of a passage having a height, considered on a given axial line of the die, which is relatively large in the region adjacent the edge 41 where the height of the orifice measured at a point on said given axial line is small; and the height of the compensating passage adjacent said edge 41 being relatively small where the height of the orifice measured at a point on said given axial line is large. The compensating passage 42 has the effect of producing an even flow of rubber across the whole width of the die orifice 20 in a manner to be described.

In operation, rubber is forced from the extruder barrel, by rotation of a conventional extruder screw within the barrel, through the opening 26 and the honeycomb structure 30 into the channel 23. The plates 28 and 29 have the effect of preventing any rotary movement of the rubber relative to the axial direction of the die caused by the rotation of the extruder screw. This helps to ensure that the rubber flows uniformly in the axial direction of the die.

The rubber then passes into the compensating passage 42. As the profile of the edge 41 of the passage 42 is the inverse of the profile of the die orifice, the regions thereof, adjacent the edge 41, on the same axial lines as the parts of the orifice of greater height are of relatively smaller height, and vice-versa. This has the effect of impeding the flow of rubber along the axial lines leading to the portions of the orifice of greater height, whilst enhancing the flow of rubber towards the portions of the orifice of smaller height, and thus helps to compensate for the greater resistance to flow of the extrusion offered by the regions of the orifice of smaller height. The flow of rubber is thus made to take place at a more nearly uniform rate over the whole width of the orifice.

The rubber passes from the compensating passage 42 into the passageway 34. In the passageway 34, the extrusion is first formed to the shape of the orifice 20, and after this shape has become established the extrusion is severed axially by the knife blades 37 to relieve any stresses set up in the extrusion. The severed portions of the extrusion then re-combine before being extruded from the orifice 20.

The tread strip produced is more uniform and has less tendency to twist or distort than a tread strip produced by a conventional die.

An additional effect, in the case of both the embodiments described above, is that the long passageway provides a higher total back pressure to the rubber being extruded from the extruder barrel. This helps to ensure that the extruder barrel is always filled with rubber and ensures a steady rubber supply to the die, with the avoidance of porosity in the extrusion. In addition, the surface finish of the extrusion is improved as a result of the avoidance of fluctuations in the rate at which the rubber emerges from the die.

Having now described our invention, what we claim is:

1. An extrusion die for plastic material such as rubber, said die having an orifice at least one part of which is of relatively greater height than the remainder of the orifice and a passageway for said material to connect the orifice with means for supplying said material under pressure, the passageway having a transverse cross-sectional profile similar to that of the orifice, at least one cutting element disposed within the passageway to cut an extrusion axially in passing through said passageway, said element being positioned so that the cut portions of the extrusion recombine before being extruded from the orifice, said die having a compensating passage forming a continuation of said passageway at the end of the passageway remote from the orifice, said compensating passage having, at the end thereof remote from the orifice, a transverse cross-sectional profile which varies in height across its width so that the height of the compensating passage, considered at a point on a given axial line of the die at said end remote from the orifice is relatively large where the height of the orifice measured at a point on said axial line is small, and a height of the compensating passage considered at a point on a second axial line of the die at said end remote from the orifice is relatively small where the height of the orifice measured at a point on said second axial line is large, the compensating passage having a transverse cross-sectional profile at its end nearer the orifice similar in form to that of the orifice, and the compensating passage having a shape which provides a gradual variation in profile between its ends.

2. The extrusion die of claim 1 in which the ratio of the length of the passageway to the maximum height of the orifice is at least 3:1.

3. A tread strip extrusion die according to claim 1 the transverse cross-sectional profile of the end of the compensating passage remote from the orifice being substantially an inverted form of the profile of the orifice.

4. An extrusion die according to claim 1 wherein a plurality of cutting elements are provided, said elements being distributed across the width of the passageway and extending in the direction in which the height of the orifice is measured.

5. An extrusion die according to claim 1 wherein the cutting element is in the form of a knife blade.

6. An extrusion die according to claim 1 wherein the extrusion die is provided with means for preventing rotary movement of said material with respect to the axis of the die.

7. An extrusion die according to claim 6 wherein said means for preventing rotary movement of said material comprises at least one laminar element extending axially and transversely with respect to the die, in a region of the die axially further from the die orifice than said passageway.

References Cited in the file of this patent

UNITED STATES PATENTS

| | | |
|---|---|---|
| 1,245,898 | Gates | Nov. 6, 1917 |
| 2,047,395 | Stelkens | July 14, 1936 |
| 2,481,275 | Ambrette | Sept. 6, 1949 |
| 2,636,218 | Orsini | Apr. 28, 1953 |
| 2,734,224 | Winstead | Feb. 14, 1956 |

FOREIGN PATENTS

| | | |
|---|---|---|
| 859,368 | Germany | Dec. 15, 1952 |